United States Patent
Iwasaki (10) Patent No.: US 8,069,234 B2
(45) Date of Patent: Nov. 29, 2011

(54) WEB SERVICE EXECUTION METHOD, PROCESSING METHOD AND APPARATUS

(75) Inventor: Shingo Iwasaki, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 356 days.

(21) Appl. No.: 11/753,773

(22) Filed: May 25, 2007

(65) Prior Publication Data

US 2007/0282857 A1  Dec. 6, 2007

(30) Foreign Application Priority Data

Jun. 1, 2006  (JP) ................................. 2006-153988

(51) Int. Cl.
*G06F 15/173* (2006.01)
*G06F 15/16* (2006.01)

(52) U.S. Cl. ......... 709/223; 709/224; 709/225; 709/246

(58) Field of Classification Search .................. 709/246, 709/223–225

See application file for complete search history.

(56) References Cited

U.S. PATENT DOCUMENTS

| | | | |
|---|---|---|---|
| 2004/0143577 A1* | 7/2004 | Shalabi et al. .................. | 707/10 |
| 2005/0108388 A1* | 5/2005 | Bou-Ghannam et al. ..... | 709/224 |
| 2006/0206599 A1* | 9/2006 | Milligan et al. .............. | 709/223 |
| 2007/0016429 A1* | 1/2007 | Bournas et al. ................... | 705/1 |

FOREIGN PATENT DOCUMENTS

| | | |
|---|---|---|
| JP | 2003-178049 | 6/2003 |
| JP | 2004-361993 | 12/2004 |
| JP | 2005-111710 | 4/2005 |
| JP | 2005-173892 | 6/2005 |
| JP | 2006-82270 | 3/2006 |

OTHER PUBLICATIONS

Japanese Office Action dated Jun. 3, 2011 issued during prosecution of related Japanese application No. 2006-153988.

* cited by examiner

*Primary Examiner* — David England
*Assistant Examiner* — Clarence John
(74) *Attorney, Agent, or Firm* — Fitzpatrick, Cella, Harper & Scinto

(57) ABSTRACT

A web service execution apparatus that sequentially executes a plurality of web services develops a first information for invoking a first web service in a memory, and deletes the first information that is developed in the memory. The apparatus then develops a second information for invoking a second web service in the memory from which the first information is deleted, and executes a plurality of web services in accordance with the first or the second information that is developed in the memory.

12 Claims, 10 Drawing Sheets

① `<process name="BpelServiceForPrint" targetNamespace="http://www.bpel.com/`
   `BpelServiceForPrint.bpel"`
   `xmlns:nsbpel="http://www.bpel.com/pf/ns/BpelService.xsd"`
   `xmlns:bswsdl="http://www.bpel.com/pf/ns/BpelService.wsdl"`
   `xmlns:bpswsdl="http://www.bpel.com/pf/ns/BpelActionService.wsdl"`
   `xmlns:xsd="http://www.w3.org/2001/XMLSchema">` — 214

② `<variables>`
   `<variable name="input" messageType="bswsdl:Request" />`
   `<variable name="output" messageType="bswsdl:Response" />`
   `<variable name="bpelactionserviceIn" massageType="bpswsdl:Request" />`
   `<variable name="bpelactionserviceOut" massageType="bpswsdl:Response" />`
   `</variables>` — 215

`<sequence>`

③ `<receive name="receiveInput"`
   `portType="bswsdl:BpelServicePT" operation="bpelaction" variable="input"`
   `createInstance="yes" />` — 216

④ `<assign>`
   `<copy>`
   `<from variable="input" />`
   `<to variable="bpelactionserviceIn" />`
   `</copy>`
   `</assign>` — 217

⑤ `<invoke name="WEBServiceA"`
   `portType="bpswsdl:BpelActionServicePT" operation="Request"`
   `inputVariable="bpelactionserviceIn" outputVariable="bpelactionserviceOut" />` — 218

⋮

⑥ `<assign>`
   `<copy>`
   `<from variable="bpelactionserviceOut" />`
   `<to variable="output" />`
   `</copy>`
   `</assign>` — 219

⑦ `<reply name="replyOutput"`
   `portType="bswsdl:BpelServicePT" operation="bpelaction" variable="output" />` — 220

`</sequence>`
`</process>`

WEB SERVICE EXECUTION METHOD, PROCESSING METHOD AND APPARATUS

BACKGROUND OF THE INVENTION

1. Field of the Invention

The present invention relates to a web service execution method, a processing method, and an apparatus.

2. Description of the Related Art

Technology is known that reads a structured document (hereunder, referred to as "sequential processing description document") in which a description has been made for sequentially executing a web service, and sequentially executes a web service in accordance with the description contents thereof. The description in the sequential processing description document is made, for example, in accordance with BPEL (Business Process Execution Language). An information processing apparatus reads the sequential processing description document to execute a web service in which technology such as a sequential processing type of SAX (Simple API for XML) that handles a document as an event stream or DOM (Document Object Model) that handles a document as a tree structure is used.

Regarding the above described type of web service, technology is being developed to solve the problem of how to effectively generate execution procedures of a plurality of web services. Japanese Patent Laid-Open No. 2004-361993 discloses technology that flexibly combines unit flows for performing relatively small processing to dynamically assemble and execute a logical single web service flow as an overall flow. Further, Japanese Patent Laid-Open No. 2005-173892 discloses technology that generates an instruction list that indicates which combination with which to execute processing based on a plurality of instruction lists in which the procedures of individual services are described.

In sequential processing that reads the contents of a structured document in sequence from the top layer part, as typified by SAX, there is a problem that it is difficult to refer to document contents in a position that is forward of the position of the document contents that have been read, that is, to perform forward reference inside a document. More specifically, as the structure of a sequential processing description document becomes more complex, the correspondence by SAX becomes more difficult. This is because, when forward referencing is performed using only the SAX method, it is necessary to make a design regarding with which method description contents that a user wants to reference are to be stored (structured design for data retention) and also with which method those description contents are to be referenced (I/F design).

Further, in a method that performs processing after developing an entire structure that is shown in a sequential processing description document in memory as a structural model, as typified by DOM, there is a problem that if the document contents of a processing object grow to an enormous amount, it puts a squeeze on the memory capacity.

SUMMARY OF THE INVENTION

A feature of the present invention is to flexibly deal with descriptions of documents for sequentially executing a plurality of web services using a small memory.

Another feature of the present invention is to provide a web service execution method that sequentially executes a plurality of web services, comprising the steps of: developing a first information for invoking a first web service in a memory; deleting the first information that is developed in the memory; developing a second information for invoking a second web service in the memory from which the first information is deleted; and executing a plurality of web services in accordance with the first or the second information that is developed in the memory.

A further object of the present invention is to provide a method of processing a document in which information for sequentially executing a plurality of web services is described, comprising the steps of: converting a portion relating to invocation processing of a web service that is included in the document into a child document; and replacing the portion relating to invocation processing of the web service that is included in the document with a reference to the child document.

Further features of the present invention will become apparent from the following description of exemplary embodiments with reference to the attached drawings.

BRIEF DESCRIPTION OF THE DRAWINGS

FIGS. 2A and 2B are views that explain a sequential processing description document;

DESCRIPTION OF THE EMBODIMENTS

Preferred embodiments of the present invention will now be described in detail in accordance with the accompanying drawings.

First, an overview of a configuration for sequentially invoking web services to cause them to perform processing is described with reference to FIG. 1.

Figure 1:
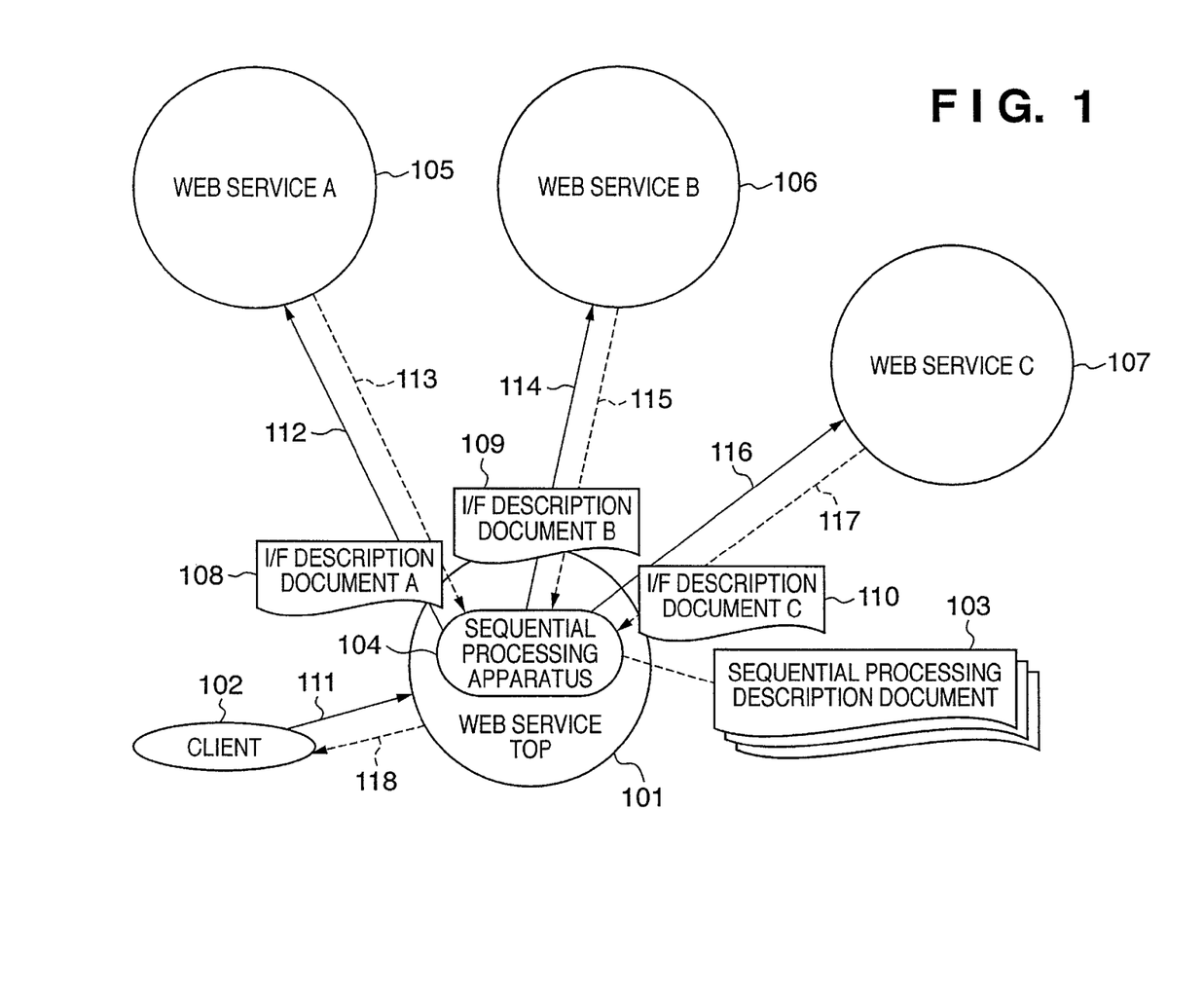
FIG. 1 is a view that describes an overview of a sequential processing apparatus according to an embodiment.

In FIG. 1, a web service TOP 101 is a web service that plays a central role in sequential processing. Upon reception of a sequential processing instruction from a client 102, the web service TOP 101 reads a sequential processing description document 103 in which execution procedures of the web service are described. The web service TOP 101 then utilizes a sequential processing apparatus 104 to, for example, invoke web services A 105, B 106, and C 107 (hereunder, described as web services A, B, and C) and cause them to perform processing in the manner described in the sequential processing description document 103. The web services A to C have I/F description documents 108 to 110 (hereunder, referred to as I/F description documents A to C), respectively, in which a location (address) of the relevant service and an interface (I/F) for invoking the service is described. The I/F description document is described, for example, using WSDL (Web Service Description Language). The web service TOP 101 reads in these I/F description documents in advance, and retains information of other web services to be invoked.

The client 102 issues a request to execute the contents of the sequential processing description document 103, and sends a message as a processing object (111). The sequential processing apparatus 104 of the web service TOP 101 acquires the sequential processing description document 103 to be executed in accordance with the message, reads in the overall structure and information and the like of the sequential processing description document 103, and interprets the entire description contents. The sequential processing apparatus 104 then causes the web services to be executed in accordance with the description contents that have been interpreted. If it is assumed that the sequential processing description document 103 describes that the web services A, B, C are to be executed in sequence, the sequential processing apparatus 104 operates as described below.

First, the sequential processing apparatus 104 sends the message that is received from the client 102 to the web service A 105 (112), causes the web service A to process the message, and receives a message as the processing result (113). Similarly, as denoted by reference numerals 114 to 117, the sequential processing apparatus 104 invokes the web services B and C in sequence to cause them to process the message. For example, in order to execute the web service B 106, the sequential processing apparatus 104 can also use the response of the web service A 105 that is the processing result up to that time. The sequential processing apparatus 104 returns (118) a message of the processing result acquired by the response (117) from the web service C 107 that is the final service to the client 102 to conclude the processing with respect to the request from the client.

In the above described processing, when the sequential processing apparatus 104, for example, processes a sequential processing description document in accordance with DOM, the sequential processing apparatus 104 executes processing after retaining the overall structure and information of the sequential processing description document in question in an internal memory. Therefore, if the description contents of the sequential processing description document constitute an enormous amount, excessive strain is placed on the internal memory capacity of the sequential processing apparatus 104. As a result, there is the possibility of various malfunctions occurring, such as the sequential processing apparatus 104 not being able to respond appropriately in a case where the resources of the device that is the web service TOP 101 are inadequate.

In contrast, the problem of memory resources can be solved by using sequential processing according to SAX. However, when the relevant sequential processing description document includes a forward reference when executing the web service, it is difficult for sequential processing according to SAX to handle the forward reference. Therefore, as described in detail below, the sequential processing apparatus 104 according to the present embodiment carries out processing by dividing the sequential processing that is described in the sequential processing description document into web service units.

Figure 2A:
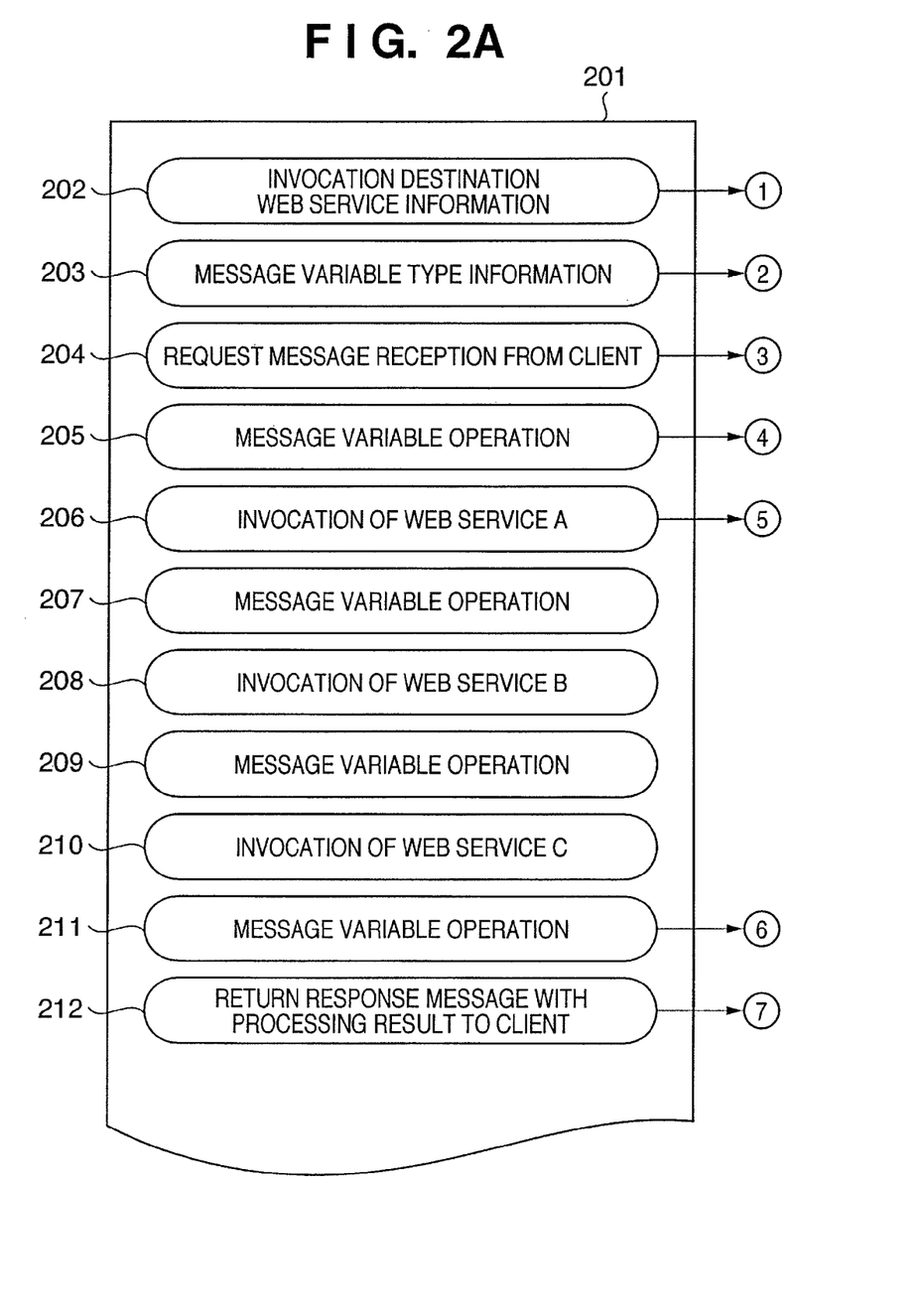

FIGS. 2A and 2B are a view that illustrates a data configuration example of a sequential processing description document 103 and specific description examples. A description configuration example 201 illustrates a configuration example of the sequential processing description document 103. The description configuration example 201 has description portions 202 to 212. The I/F information of invocation destination web services is described in the description portion 202. Information regarding the type of message variable that corresponds to each web service is described in the description portion 203. Information that is required to enable reception of a request message from a client is described in the description portion 204.

A message variable operation to extract data from the contents of a message and map the data into another message type and the like is described in the description portion 205. Information that is necessary to invoke the web service A is described in the description portion 206. Accordingly, a message conversion operation described in the description portion 205 is a message conversion operation that extracts a portion relating to the web service A and maps the portion into a message type that corresponds to the web service A. Message conversion operations that correspond to the web services B and C and information necessary to invoke the web services B and C are described in the description portions 207 to 210, similarly to case of the web service A.

A message conversion operation that invokes each web service and maps the response message of the final result for which processing has been performed into the message type of the client is described in the description portion 211. In the description portion 212 is described information that is necessary for returning a response message that has undergone a message conversion operation to the client.

Reference numeral 213 denotes an example of a specific sequential processing description document that is based on the description configuration example 201 (hereunder, this description document is referred to as "sequential processing description document 213"). The sequential processing description document 213 according to the present example is described in a format, known as WSBPEL (Web Services Business Process Execution Language), for describing a processing flow of a web service with an XML (extensible Markup Language) document. Hereunder, the data configuration shown in the description configuration example 201 is compared with the sequential processing description document 213.

In FIG. 2B, a description portion 214 corresponds to the description portion 202. Information relating to the web service at the invocation destination, for example, a namespace for specifying I/F information such as WSDL, is described in the description portion 214. A description portion 215 corresponds to the description portion 203. In the description portion 215, information regarding the message variable type is described with a <variables> tag. The description portion 215 contains a description that indicates the location of the type information of a message described in WSDL corresponding to the web service of the invocation destination and the like. When executing sequential processing, processing is carried out while referring to the information of this portion. A description portion 216 corresponds to the description portion 204. In the description portion 216, information necessary for receiving a request message from the client is described with a <receive> tag.

A description portion 217 corresponds to the description portion 205. In the description portion 217, a message variable operation such as an operation that extracts data from the contents of a message and maps the contents into another message type or stores the message as it is in a different variable is described with an <assign> tag or the like. A description portion 218 corresponds to the description portion 206. Information necessary for invoking the web service A, for example, a reference to a method name or a message variable, is described with an <invoke> tag.

A description portion 219 corresponds to a description portion 211. A message variable operation is described in the description portion 219 with an <assign> tag or the like in a similar form as the description portion 217. A description portion 220 corresponds to the description portion 212. In the description portion 220, information necessary for invoking each web service and returning to the client a response message for the final result for which processing has been performed is described with a <reply> tag.

As described above, it is possible to describe a flow for sequentially invoking the web services to cause them to perform processing with an XML document. By parsing the XML document from an upper layer portion and interpreting the document contents, web service can be sequentially invoked and executed in the manner described. In this connection, since the sequential processing description document 213 is a specific example of a WSBPEL document, according to the present embodiment the processing contents are described utilizing an example of the data configuration of the description configuration example 201.

Figure 3:
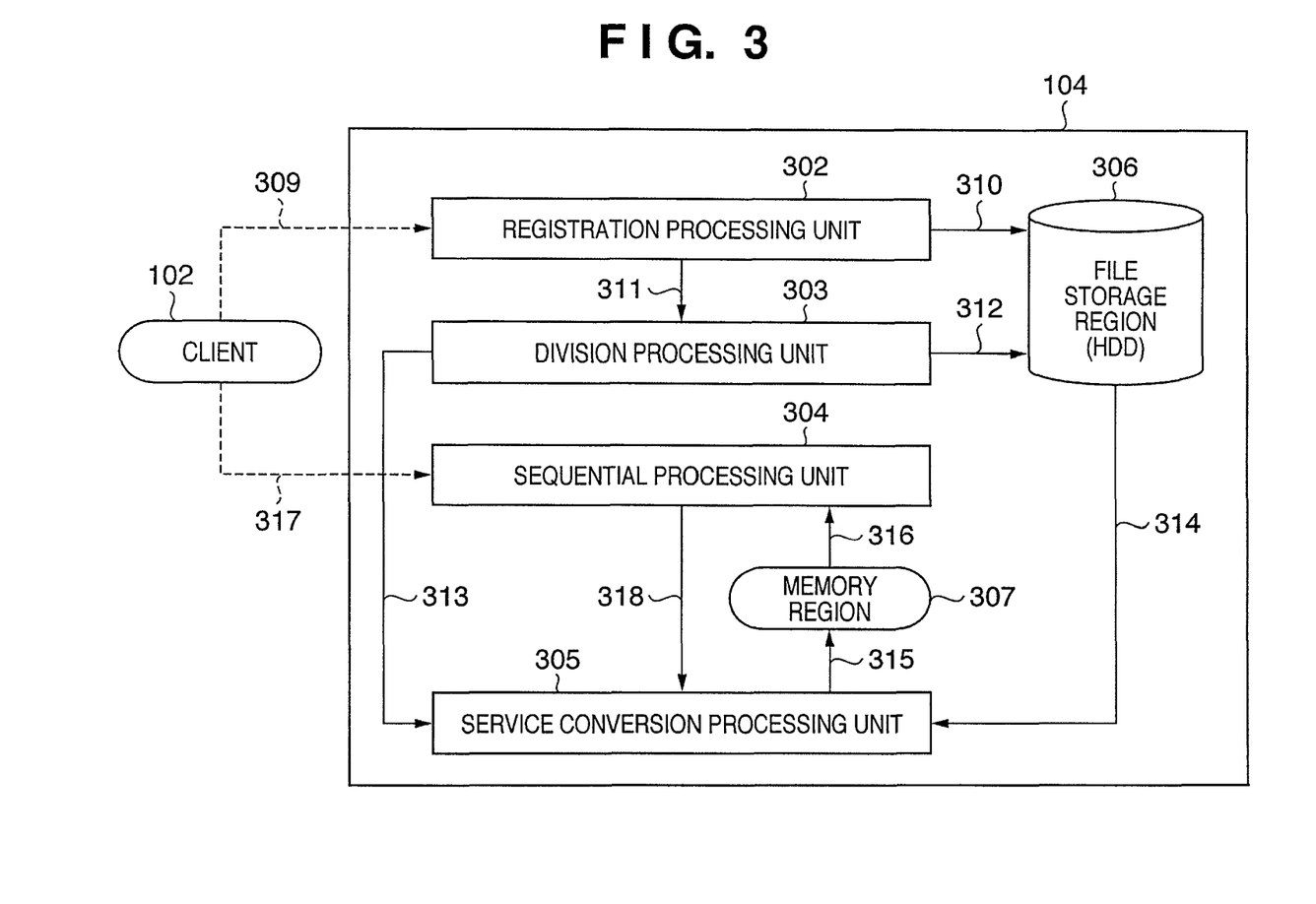
FIG. 3 is a block diagram that illustrates the detailed configuration of the sequential processing apparatus according to the embodiment.

FIG. 3 is a block diagram that illustrates the entire configuration of the sequential processing apparatus 104 as an information processing apparatus according to the present embodiment. Hereunder, the flow of processing in response to a request received from a client is described with reference to FIG. 3. In this connection, the sequential processing apparatus 104 receives the following two kinds of requests from a client:
(i) a request to register/delete a sequential processing description document (103) and I/F description documents for web services (108 to 110); and
(ii) a request to execute sequential processing.

First, processing in a case where a client requests to register/delete a sequential processing description document and I/F description documents for web services is described.

In FIG. 3, a registration processing unit 302 performs processing that registers the sequential processing description document 103 and the I/F description documents 108 to 110 in a file storage region 306. Upon receipt of a registration request from client 102 (309), the registration processing unit 302 receives files in which the sequential processing description document (for example, WSBPEL) 103 and the I/F description documents (for example, WSDL) 108 to 110 are described. The file in which the sequential processing description document (for example, WSBPEL) 103 is described can be received from an unshown server on a network or the client 102. The files in which the I/F description documents (for example, WSDL) 108 to 110 are described can be received from the web services A to C or the client 102. The registration processing unit 302 registers the sequential processing description document 103 and the I/F description documents 108 to 110 that have been received in the file storage region 306 (310).

The received sequential processing description document 103 is also supplied from the registration processing unit 302 to a division processing unit 303 (311). The division processing unit 303 extracts the description contents of the supplied sequential processing description document 103 in units of portions that invoke external web services (in the example of FIG. 1, the web services A, B, and C). The portions that are extracted are considered child documents. The division processing unit 303 then divides the sequential processing description document 103 in the form of a parent document and child documents that are invoked from the parent document. The division processing unit 303 registers the parent documents and child documents in the file storage region 306 (312). The details of the parent documents and child documents are described later.

Further, in order to accept a request for starting processing contents of the sequential processing description document that has been registered, the division processing unit 303 sends an instruction to perform service conversion for the contents of the sequential processing description document that is registered to a service conversion processing unit 305 (313). Upon receiving this instruction, the service conversion processing unit 305 acquires the target parent sequential processing description document and I/F description document from the file storage region 306. The details of this operation are described later.

The service conversion processing unit 305 then parses the respective contents, organizes the contents as objects, and writes the objects in a memory region 307 (315). According to the present embodiment, the description document is converted into a service according to DOM (Document Object Model) specifications, and the information that has been converted into a service (structural model) is developed in the memory region 307.

It is possible for the sequential processing unit 304 to accept a request at any time by reading information from the memory region 307 (316).

In this connection, although in the above description a child document is created for each web service, a configuration may also be adopted that creates a child document that includes a plurality of successive web services (for example, web services A and B). The important point is that a child document is created based on a portion relating to invocation of a web service (for example, a description of a message variable operation and invocation of a web service).

Next, processing in a case in which execution of sequential processing is requested from the client 102 is described. When a sequential processing execution request from the client 102 is received by the sequential processing unit 304 (317), the sequential processing unit 304 executes sequential processing (parent sequential processing) that corresponds to the request, which is stored in the memory region 307. When the parent sequential processing invokes sequential processing of a child, the sequential processing unit 304 instructs the service conversion processing unit 305 to perform conversion into a service with respect to the sequential processing of the child to be invoked (318). Upon receiving the instruction, the service conversion processing unit 305 obtains from the file storage region 306 a sequential processing description document and an I/F description document that are required with respect to the sequential processing of the child that has been specified (314). The service conversion processing unit 305 then parses each of the obtained documents, organizes the contents as objects, and writes the objects into the memory region 307 (315). Thus, a state is entered in which a request can be accepted as a child service.

Upon completion of service conversion by the service conversion processing unit 305 with respect to sequential processing of the child that has been specified from the sequential processing unit 304, the sequential processing unit 304 sends a request message to the child that has been converted into a service. As a result, the processing of the child is performed, and the sequential processing unit 304 receives a response message that is the processing result thereof. Upon receiving the response message, the sequential processing unit 304 sends an instruction to the service conversion processing unit 305 to delete information relating to the child that has been invoked that is written in the memory region 307. The service conversion processing unit 305 deletes the information relating to the child from the memory region 307 as indicated to release the memory. The overall processing is executed while performing processing to convert a child into a service and delete the child as described above each time the parent invokes a child, and a response message that is the final processing result is returned to the client 102 to end the series of processing.

Figure 4A:
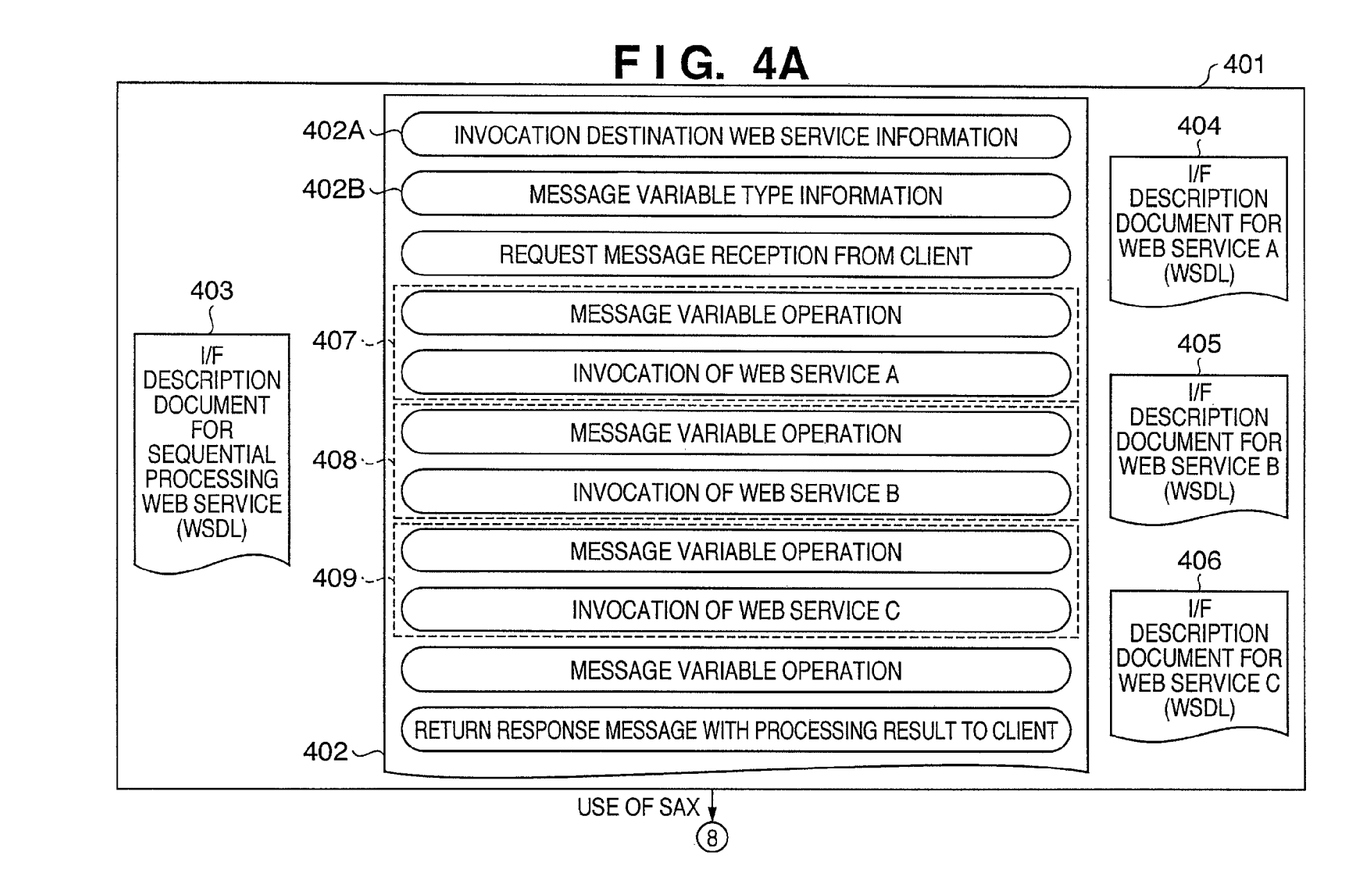
FIGS. 4A, 4B and 4C are views that explain division processing of a sequential processing description document by a division processing unit of the sequential processing apparatus according to the embodiment.
Figure 4B:
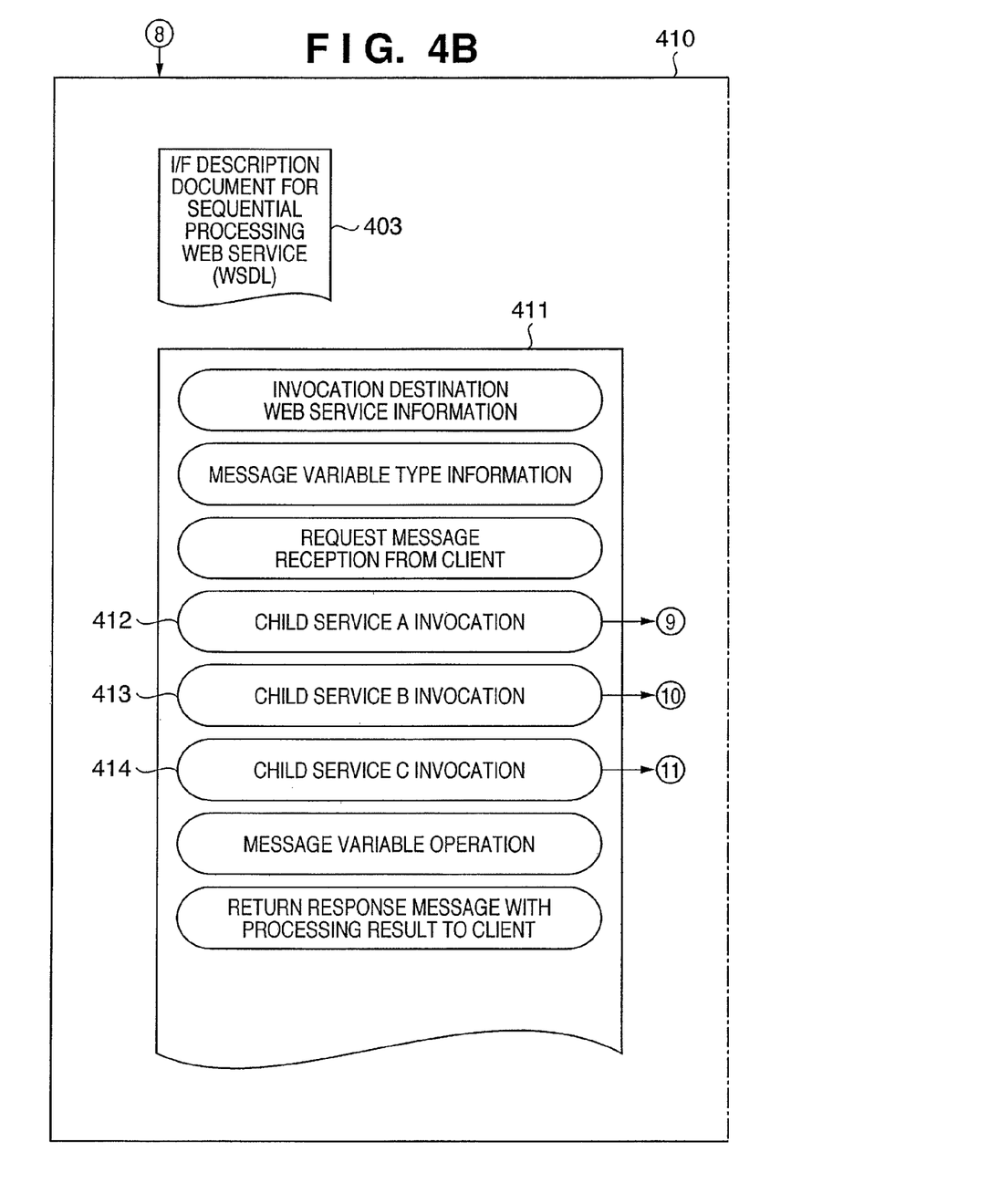
Figure 4C:
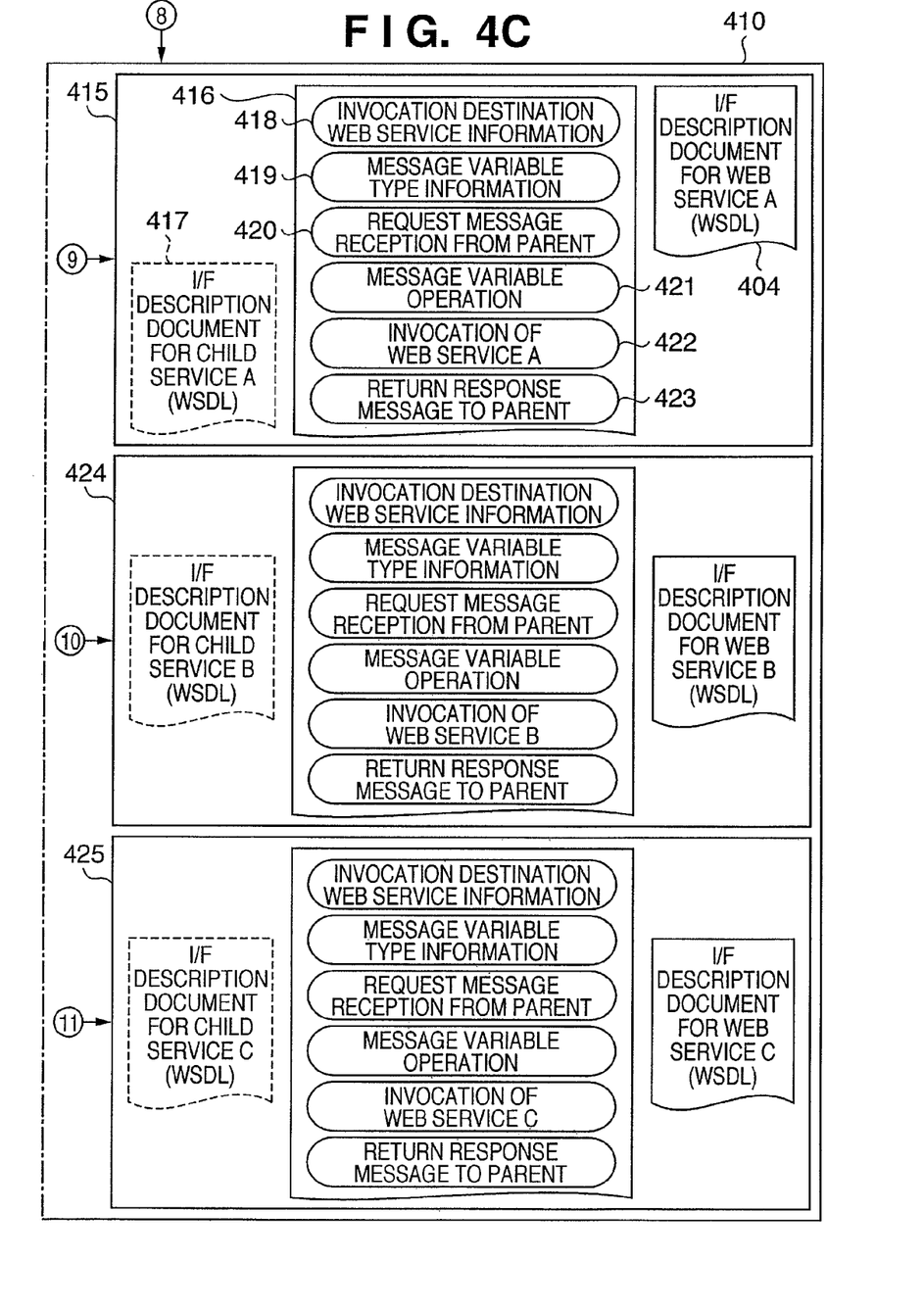

FIGS. 4A to 4C are views for explaining the above described division processing at the division processing unit 303 more specifically. In FIGS. 4A to 4C, information 401 is information that is required for causing execution of sequential processing. The information 401 includes a sequential processing description document 402 and I/F description documents 403 to 406. The registration processing unit 302 is configured to store the information 401 in the file storage region 306. The sequential processing description document 402 corresponds to the sequential processing description document 201 shown in FIG. 2A. The I/F description document 403 is an I/F description document for a sequential processing web service (for example, WSDL), and is a document that is required for converting sequential processing that is described in the sequential processing description document 402 into a web service.

The I/F description documents 404 to 406 are I/F description documents for the web services A to C that are invoked during execution of each sequential processing. The I/F description documents 404 to 406 correspond to the I/F description documents 108 to 110. In this connection, although the configuration of the description contents is shown for the sequential processing description document 402, as described above using FIG. 2A, in practice the sequential processing description document 402 is described with an XML document such as WSBPEL. Using the attributes or tags of elements described in the sequential processing description document 402 it is possible to determine what kind of information is described at which location in the document.

The division processing unit 303 parses the sequential processing description document 402 by, for example, the SAX method. First, the division processing unit 303 extracts an invocation portion for an external web service and a message variable operation portion that is described immediately prior thereto (407 to 409) as a single "child sequential processing description", respectively. The division processing unit 303 then determines that the extracted portion is a portion that can be independently converted into a service, and divides the portion from the original document. More specifically, the sequential processing description document 402 is divided into "child sequential processing descriptions" (407 to 409) that correspond to "child services" of a number corresponding to the number of web service invocations, and a "parent sequential processing description" that includes invocations for those "child services".

An information 410 shows the state after division processing is performed for the sequential processing description document 402 included in the information 401. A parent sequential processing description document 411 is a description document in which the contents of the description portions (child sequential processing descriptions) that are the child sequential processing description documents (407 to 409) in the sequential processing description document 402 are replaced with descriptions for invoking the child services (412 to 414). An information 415 relating to a child service A includes a child sequential processing description document 416, an I/F description document 417 for child service A for converting the document in question into a web service as child service A, and an I/F description document 404 for web service A for invoking web service A.

In the child sequential processing description document 416 the description contents of the description portion 407 that is present in the original sequential processing description document 402 are described in description portions 421 and 422 of the child sequential processing description document 416. Description portions 420 and 423 are also provided in a form that sandwiches the description portions 421 and 422 from the top and bottom. Information necessary for receiving a request message from the parent is described in the description portion 420. Information necessary for returning to the parent a response message as the result of processing by the child service in question is described in the description portion 423. Further, information necessary for the web service A (invocation destination web service information relating to the web service A) that is extracted from "invocation destination web service information" 402A that is described in the sequential processing description document 402 is described in the description portion 418. Information necessary for the relevant child service A is extracted from "message variable type information" 402B of the sequential processing description document 402, and the described message variable type information is described in the description portion 419.

In this connection, information required for the child service A is extracted form the sequential processing description document 402, and those contents are utilized to newly and automatically create the I/F description document 417 (for example, as WSDL) for child service A for invoking the child service A as a web service. The information 424 and 425 relating to the child service B and child service C are generated in the same manner as the information 415 relating to the child service A.

The service conversion processing unit 305 executes service conversion processing based on the I/F description document 403 and the parent sequential processing description document 411, for example, in response to an execution instruction of the sequential processing description document 402 from the sequential processing unit 304, and generates the parent service in the memory region 307. In the process of executing the parent service, the sequential processing unit 304 executes invocation of the child services (412 to 414). When invoking a child service, the sequential processing unit 304 instructs the service conversion processing unit 305 to perform service conversion for the corresponding child service. Upon receiving an instruction to, for example, perform service conversion for the child service A from the sequential processing unit 304, the service conversion processing unit 305 reads the information 415 from the file storage region 306, parses the contents, and stores the contents as an object (performs service conversion) in the memory region 307. Further, when a deletion instruction is received from the sequential processing unit 304, for example, the service conversion processing unit 305 deletes the result obtained by subjecting the information 415 to service conversion from the memory region 307.

Figure 5:
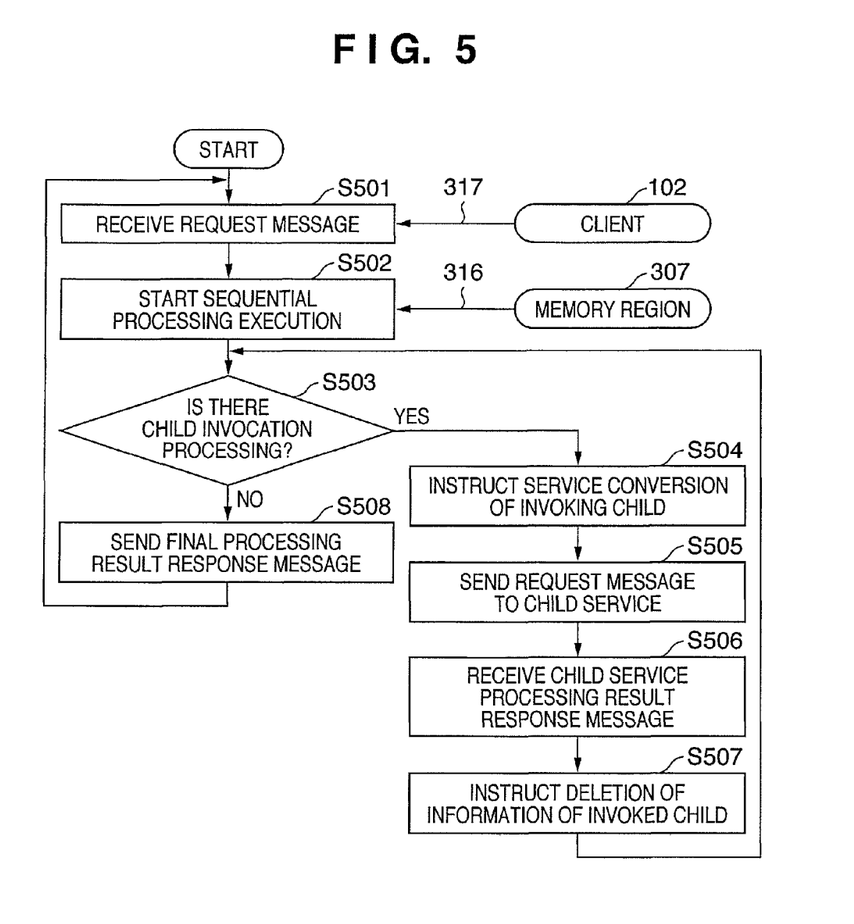
FIG. 5 is a flowchart that illustrates processing of a sequential processing unit in the sequential processing apparatus according to the embodiment.

FIG. 5 is a flowchart that illustrates the processing contents of the sequential processing unit 304. Upon receiving a message (317) requesting execution of sequential processing from the client 102 in step S501, the sequential processing unit 304 executes sequential processing corresponding to that request in step S502 using information (parent service) that is written in the memory region 307 (316).

The sequential processing unit 304 determines the presence or absence of child invocation processing in the process of executing the sequential processing of the parent service (step S503). When there is processing that invokes a child service (when an instruction to execute a child document is detected), the operation advances from step S503 to step S504 to output an instruction to perform service conversion for a child sequential processing description document at the invocation destination to the service conversion processing unit 305. For example, when executing invocation of service A (412), the sequential processing unit 304 specifies the information 415 and issues an instruction to perform service conversion. When the child service at the invocation destination undergoes service conversion and the service conversion information is developed in the memory region 307, in step S505 the sequential processing unit 304 sends a request message to request execution of processing to the child service in question. Thereafter, the web service is executed at the child service at the invocation destination and the processing result is returned as a response message from the child service to the parent service.

The sequential processing unit 304 receives the response message in step S506. Upon receiving the response message, that is, the processing result, since the child service at the invocation destination in question is unnecessary, in step S507 the sequential processing unit 304 instructs the service conversion processing unit 305 to delete information relating to the child service in question (the child service that has been invoked). The service conversion processing unit 305 deletes the service conversion information of the specified child service from the memory region 307. This deletion operation may be executed prior to developing the next child service. More specifically, according to another embodiment, prior to developing a child service, if child service information that has been previously executed remains in the memory region 307, that previous child service information is deleted. Thereafter, the sequential processing unit 304 returns to step S503 to determine the existence or non-existence of a next child invocation processing.

As described above, in executing sequential processing (parent service), the processing of the above steps S504 to S507 is repeated the same number of times as the number of child services to be invoked. For example, in the case of the sequential processing description document 402 (=parent sequential processing description document 411), the processing of steps S504 to S507 is repeated three times in correspondence with the web services A, B, and C. When it is then determined that a child service to be invoked does not exist in step S503, the processing proceeds to step S508. In step S508, the items denoted by reference numerals 211 and 212 (219 and 220) shown in FIG. 2 are executed and a final processing result response message is sent to the client 102 that issued the request to end the present processing.

Figure 6:
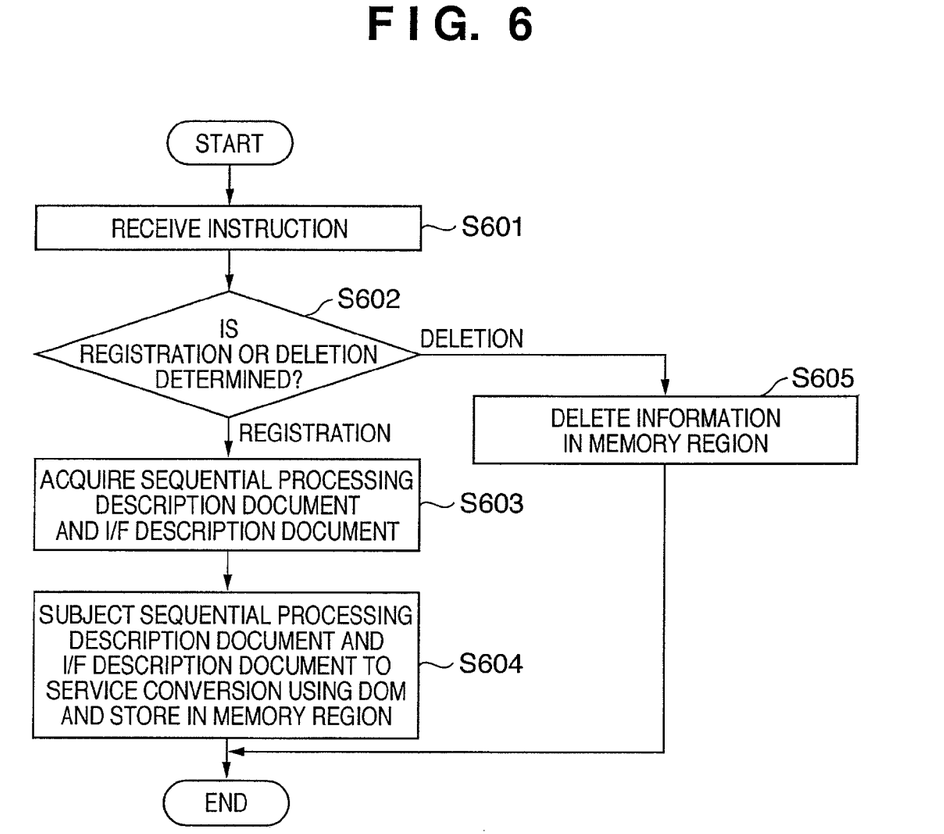
FIG. 6 is a flowchart that illustrates processing of a service conversion processing unit in the sequential processing apparatus according to the embodiment.

FIG. 6 is a flowchart showing processing contents of the service conversion processing unit 305. In step S601, the service conversion processing unit 305 receives an instruction to register a service (service conversion) or an instruction to delete service conversion information relating to a service. In step S602, the service conversion processing unit 305 determines whether the instruction that is received in step S601 is a registration instruction or a deletion instruction. When the received instruction is a registration instruction the processing proceeds from step S602 to S603. In step S603 the service conversion processing unit 305 acquires information relating to a service that is a registration object from the file storage region 306 (in the present embodiment, any of information 411, 415, 424 and 425). The ID of the service that is the object is included in the service registration instruction from the sequential processing unit 304. As described above, for example, the information (415) relating to the service includes files for the sequential processing description document (416) and the I/F description documents (404 and 417). Then in step S604, the contents of the sequential processing description document and the I/F description document are subjected to service conversion using a DOM method, and stored as a service in the memory region 307 in a state in which the structure is retained. That service is then set as a web service in a state in which a request can be accepted.

In contrast, when it is determined at step S602 that a deletion instruction is received, the processing advances to step S605 to delete the information (service) that is the object from the memory region 307 and release the memory. The ID of the service conversion information that is the deletion object is included in the deletion instruction from the sequential processing unit 304. Thus, the service conversion and deletion processing is performed as described above.

Figure 7:
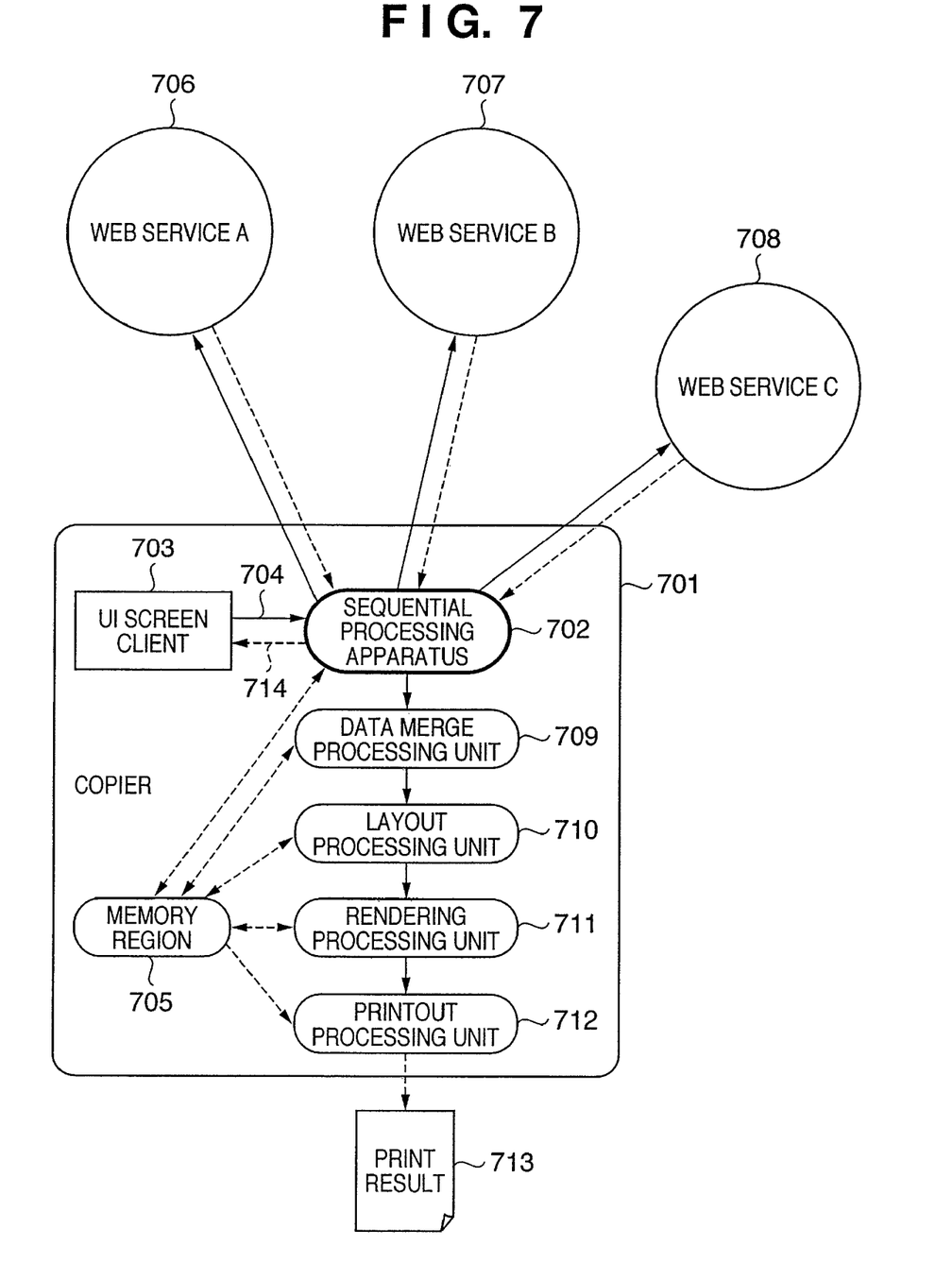
FIG. 7 is a block diagram illustrating a configuration example of a copier in which the sequential processing apparatus according to the embodiment is applied.

The internal processing (registration processing unit 302, division processing unit 303, sequential processing unit 304, and service conversion processing unit 305) of the sequential processing apparatus 104 according to the present embodiment was described specifically above. Next, an example that applies the sequential processing apparatus 104 as described above is described using FIG. 7. FIG. 7 is a block diagram that illustrates the internal configuration of a copier capable of organizing, laying out, rendering, and printing out on paper data that is acquired from a web service.

In FIG. 7, a copier 701 can perform processing such as copying, scanning, and printing. The copier 701 is provided with a sequential processing apparatus 702 (having the same functions and configuration as the sequential processing apparatus 104 in FIG. 1). A UI screen 703 (for example, liquid crystal or the like) that is attached to the copier 701 acts as the client 102. When a request (704) to start sequential processing is output from the UI screen 703, the sequential processing apparatus 702 acquires a sequential processing description document corresponding to that request from the memory region 705 (corresponding to the file storage region 306 and the memory region 307). Next, the sequential processing apparatus 702 performs processing that, for example, invokes the web services A to C (706 to 708) in order in accordance with the contents of the sequential processing description document, stores the final processing result data in the memory region 705, and outputs an instruction to execute processing to a data merge processing unit 709. In this case, the sequential processing apparatus 702 divides the sequential processing description document into units of web services to be executed, and the service conversion information corresponding to a child service is developed in the memory region 705 in accordance with execution, and then erased after the execution.

The data merge processing unit 709 that receives the instruction arranges the aforementioned processing result data inside the memory region 705 into data in a form that a layout processing unit 710 that performs the next processing can interpret, and stores the arranged data in the memory region 705. The layout processing unit 710 performs layout processing using the data that is stored by the data merge processing unit 709, and stores the processing result in the memory region 705. A rendering processing unit 711 performs rendering based on the data that has undergone layout processing, and stores the rendering result in the memory region 705. A printout processing unit 712 prints the rendering result on paper, and outputs the obtained print result 713. Thereafter, the sequential processing apparatus 702 returns a processing complete response to the UI screen 703 (client) (714).

By using the sequential processing apparatus 702 in a system in which data that is acquired from a web service is arranged inside a copier and printed as described above, the following advantages are obtained. Namely:

(i) the web service at a data acquisition destination can be simply switched by merely switching the sequential processing description document to be used, without creating modules corresponding to the respective web services; and (ii) since the sequential processing description document is divided and executed, even in a case in which the usable memory capacity is limited because the memory region 705 is used with a processing system other than the sequential processing apparatus 702, the amount of memory usage can be kept to the minimum. It is therefore possible to provide a configuration that utilizes web services on a device with few resources.

As described above, according to the present embodiment a sequential processing description document is divided into a document corresponding to child services that correspond to execution of web services and a document corresponding to a parent service for communicating with a client and sequentially executing child services. More specifically, a sequential processing description document (for example, a BPEL document) containing a description for invoking a plurality of web services in sequential order is read, and a portion invoking a web service in the document and a portion of an operation for a variable relating to that portion invoking the web service are extracted using a sequential processing type method (for example, SAX). The extracted portions are then arranged into a single document and taken to be a child sequential processing description document. This type of child sequential processing description document is generated for each web service. Further, in the original sequential processing description document the extracted portion is replaced with a description to cause processing to be executed according to the child sequential processing description documents, and a parent sequential processing description document that invokes the child sequential processing description documents in sequential order is created.

Subsequently, when executing processing, control is performed so that only the parent service and child service that is the execution object are developed in the memory. That is, information of a variable operation portion that is required to execute the web service to be executed and a portion to invoke the web service in question is developed as a child service in the memory, and a child service that is unnecessary is deleted from the memory. More specifically, a parent document is first subjected to DOM development and registered as a parent service, and the contents of the parent are caused to be executed by an execution instruction. Thereafter, when a child service is invoked from the parent service, the document of the child as the object is subjected to DOM development and registered as a service, a message is sent to the child service, and when the result is received the service conversion information of the child service is deleted. In this manner, sequential processing is performed while releasing from the memory the contents that have been subjected to DOM development for the child service (while deleting service conversion information of the child service).

As described above, by implementing processing that combines both a sequential processing method and a method of processing by structural modeling, the present embodiment makes it possible to execute sequential processing while releasing a memory. For example, with respect to processing for invoking web services and a variable operation inside a sequential processing description document, only the information that is necessary at the time of executing the processing is developed in the memory. It is thus possible to execute processing while releasing the memory by deleting information that is no longer required. As a result, even when executing processing on a machine with few resources, it is possible to read and execute processing of a sequential processing description document with a large capacity, enabling the web service execution apparatus according to present embodiment to be mounted on various devices with few resources. Further, since a structural model that takes a web service is developed on the memory in units of a web service to be executed, even when a forward reference exists in a sequential description document, the processing can correspond with that type of sequential description document.

Other Embodiments

It is to be understood that the object of the present invention may also be accomplished by supplying a system or an apparatus with a storage medium in which a program code of software that realizes the functions of the above described embodiment is stored, and causing a computer (or CPU or MPU) of the system or apparatus to read out and execute the program code stored in the storage medium. In this case, the program code itself read from the storage medium realizes the functions of the above described embodiment, and hence the program code and the storage medium in which the program code is stored constitutes the present invention.

Examples of the storage medium for supplying the program code include a flexible disk, a hard disk, an optical disk, a magnetic-optical disk, a CD-ROM, a CD-R, a magnetic tape, a non-volatile memory card, a ROM, and a DVD.

Further, it is to be understood that the present invention is not limited to a case where the functions of the above described embodiment are accomplished by executing the program code read out by a computer. More specifically, the present invention also includes a case in which the functions of the above described embodiment are accomplished by causing an OS (operating system) or the like which operates on the computer to perform a part or all of the actual operations based on instructions of the program code.

Further, it is to be understood that the present invention also includes a case in which the functions of the above described embodiment are accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-153988, filed Jun. 1, 2006, which is hereby incorporated by reference herein in entirety.

What is claimed is:

1. A web service execution method that sequentially invokes a plurality of web services in accordance with a document including an interface description document describing invocation processing for invoking the plurality of web services sequentially, comprising:

at least one processor executing:

a generating step of generating a first child document including a first part of the interface description document describing invocation processing for invoking a first one of the plurality of web services, and a second child document including a second part of the interface description document describing invocation processing for invoking a second one of the plurality of web services;

a replacing step of replacing the first part of the interface description document in the document with a first reference to the first child document and replacing the second part of the interface description document in the document with a second reference to the second child document;

a processing step of processing the document in which each of the first and second parts of the interface description document is replaced with the corresponding one of the first and second references in the replacing step;

a detecting step of detecting the first and second references while processing the document in the processing step;

a first developing step of developing the first child document in a memory in response to detection of the first reference in the detecting step;

a first invoking step of invoking the first one of the plurality of web services in accordance with the first child document developed in the memory in the first developing step;

a deleting step of deleting the developed first child document from the memory after a response is obtained from the first one of the plurality of web services invoked by the first invoking step;

a second developing step of developing, in response to detection of the second reference in the detecting step, the second child document in the memory from which the developed first child document is deleted in the deleting step; and a second invoking step of invoking the second one of the plurality of web services in accordance with the second child document developed in the memory in the second developing step.

2. The method according to claim 1, wherein the first and the second child documents are developed in the memory as a structural model that corresponds to the first and the second child documents.

3. The method according to claim 1, further comprising a forming step of forming first and second interface description documents, each of which corresponds to a respective one of the first and second child documents, wherein the first child document is developed in the first developing step in accordance with the first interface description document, and the second child document is developed in the second developing step in accordance with the second interface description document.

4. The method according to claim 1, wherein the first developing step converts the first child document into a service, and develops on the memory the first child document that has been converted into the service, and
the deleting step deletes from the memory the first child document that has been converted into the service.

5. A non-transitory storage medium readable by a computer on which is stored a computer-executable program for sequentially invoking a plurality of web services in accordance with a document including an interface description document describing invocation processing for invoking the plurality of web services sequentially, wherein, when executed by a computer, the computer program executes:

a generating step of generating a first child document including a first part of the interface description document describing invocation processing for invoking a first one of the plurality of web services, and a second child document including a second part of the interface description document describing invocation processing for invoking a second one of the plurality of web services;

a replacing step of replacing the first part of the interface description document in the document with a first reference to the first child document and replacing the second part of the interface description document in the document with a second reference to the second child document;

a processing step of processing the document in which each of the first and second parts of the interface description document is replaced with the corresponding one of the first and second references in the replacing step;

a detecting step of detecting the first and second references while processing the document in said processing step;

a first developing step of developing the first child document in a memory in response to detection of the first reference in the detecting step;

a first invoking step of invoking the first one of the plurality of web services in accordance with the first child document developed in the memory in the first developing step;

a deleting step of deleting the developed first child document from the memory after a response is obtained from the first one of the plurality of web services invoked by the first invoking step;

a second developing step of developing, in response to detection of the second reference in the detecting step, the second child document in the memory from which the developed first child document is deleted in the deleting step; and a second invoking step of invoking the second one of the plurality of web services in accordance with the second child document developed in the memory in the second developing step.

6. The non-transitory storage medium according to claim 5, wherein the first and the second child documents are developed in the memory as a structural model that corresponds to the first and the second child documents.

7. The non-transitory storage medium according to claim 5, further comprising a forming step of forming first and second interface description documents, each of which corresponds to a respective one of the first and second child documents, wherein the first child document is developed in the first developing step in accordance with the first interface description document, and the second child document is developed in the second developing step in accordance with the second interface description document.

8. The non-transitory storage medium according to claim 5, wherein the first developing step converts the first child document into a service, and develops on the memory the first child document that has been converted into the service, and
the deleting step deletes from the memory the first child document that has been converted into the service.

9. A web service execution apparatus that sequentially invokes a plurality of web services in accordance with a document including an interface description document describing invocation processing for invoking the plurality of web services sequentially, comprising:

at least one processor and a memory which implement:

a generating unit constructed to generate a first child document including a first part of the interface description document describing invocation processing for invoking a first one of the plurality of web services, and a second child document including a second part of the interface description document describing invocation processing for invoking a second one of the plurality of web services;

a replacing unit constructed to replace the first part of the interface description document in the document with a first reference to the first child document and to replace the second part of the interface description document in the document with a second reference to the second child document;

a document processing unit constructed to process the document in which each of the first and second parts of the interface description document is replaced with the corresponding one of the first and second references by the replacing unit;

a detecting unit constructed to detect the first and second references while processing the document by the processing unit;

a first developing unit constructed to develop the first child document in a memory in response to detection of the first reference by the detecting unit;

a first invoking unit constructed to invoke the first one of the plurality of web services in accordance with the first child document developed in the memory by the first developing unit;

a deleting unit constructed to delete the developed first child document from the memory after a response is obtained from the first one of the plurality of web services invoked by the first invoking unit;

a second developing unit constructed to develop, in response to detection of the second reference by the detecting unit, the second child document in the memory from which the developed first child document is deleted by the deleting unit; and a second invoking unit constructed to invoke the second one of the plurality of web services in accordance with the second child document developed in the memory by the second developing unit.

10. The apparatus according to claim 9, wherein the first and the second child documents are developed in the memory as a structural model that corresponds to the first and the second child documents.

11. The apparatus according to claim 9, further comprising a forming unit constructed to form first and second interface description documents, each of which corresponds to a respective one of the first and second child documents, wherein the first developing unit develops the first child document in accordance with the first interface description document, and the second developing unit develops the second child document in accordance with the second interface description document.

12. The apparatus according to claim 9, wherein the first developing unit converts the first child document into a service, and develops on the memory the first child document that has been converted into the service, and the deleting unit deletes from the memory the first child document that has been converted into the service.

* * * * *